Patented Dec. 21, 1937

2,102,720

UNITED STATES PATENT OFFICE 2,102,720

OPAQUE VITREOUS ENAMEL

Charles J. Kinzie, Niagara Falls, N. Y., assignor to The Titanium Alloy Manufacturing Company, New York, N. Y., a corporation of Maine No Drawing. Application June 12, 1934, Serial No. 730,264

4 Claims. (Cl. 106—36.2)

My invention relates more particularly to improved methods of making enamels and glazes in which zirconium compounds are used as opacifiers, such methods producing new and improved vitreous enameled and glazed coatings on metal as well as clay and other ceramic bodies.

In U. S. Patents No. 1,848,567 of March 8, 1932, and No. 1,944,938 of January 30, 1934, both to Charles J. Kinzie, processes are disclosed for the manufacture of enamel frits or glasses made opaque with zirconium compounds, such as zirconium silicate and sodium zirconium silicate introduced into the raw batch which was then smelted to produce the frit as set forth and claimed in these patents.

The object of my invention is to provide new and simplified methods for enameling and glazing with zirconium compounds and my invention comprises the discovery that by smelting part of the ingredients of the batch with the zirconium compounds excluded, and then later milling the essentially clear frit with the zirconium compound and applying same to the ware to be coated and burning same, greater economy is produced in case of vitreous enamels; of equal or possibly greater importance, my new methods permit me to produce zirconium opacity in high temperature glazes for clay and other ceramic bodies, which can not easily be obtained by the former methods in which the opacity was first chiefly produced in the frit before milling and application to the ware to be enameled or glazed.

In the case of vitreous enamels, it is possible by my improved methods materially to reduce the enameling costs by smelting only part of the materials of the batch to form an easily fusible and essentially clear glass, and then by milling this glass with zirconium compound employed to prepare the enamel or glaze slip which is applied and fired in the usual manner but with far greater economy, since only a part of the charge has been smelted to a glass.

In the case of glazes which ordinarily are required to remain opaque at temperature ranges from 1700° F. to 2700° F. during the relatively long maturing process, it is difficult and impractical first to smelt all the materials together to produce a frit since such frit is very viscous and difficult to handle in such smelting.

By my improved methods for producing opaque zirconium glazes, I take only a part of the batch, particularly those ingredients which are water-soluble, such as sodium carbonate, borax, etc., and also those which react to evolution of gases, such as the carbonates of barium and calcium, etc., and first smelt these, along with some other parts of batch (excluding zirconium materials), to form a relatively fluid melt which is run out into water and quenched to produce a frit. This frit is then milled with the remaining ingredients of the batch and water to form a slip that is applied to suitable bodies by known means, and then matured in suitable furnace or kiln. The slip may be applied to green or unburned bodies thereby effecting the maturing of the body and the glazing in one operation, or may be applied to previous burned shape or bisque.

My invention may be advantageously practiced with a number of zirconium compounds, such as the so-called insoluble zirconium compounds including zirconium oxide ($ZrO_2$) and zirconium silicate ($ZrSiO_4$), but preferably I use the lower fusing and more or less dilute acid-soluble compounds of zirconium some of which supply the required fluxes in forms of non-gas yielding combination, for example, the following:—

Sodium zirconium silicate
Barium zirconium silicate
Calcium zirconium silicate
Magnesium zirconium silicate
Lead zirconium silicate
Zinc zirconium silicate
Sodium zirconate
Barium zirconate
Calcium zirconate
Magnesium zirconate
Lead zirconate
Zinc zirconate Likewise other synthetic zirconium silicates and zirconates may be used.

By the use of one or more of these zirconium compounds, it is possible to readily vary the fusibility of an enamel or glaze, and also since the zirconium has been first altered to less refractory forms, it combines more readily in the maturing of ware to produce a homogeneous coating.

The following complete illustrative examples for enameling on metal and also for glazing ceramic bodies will show the nature of my discoveries, and will also serve to show how my invention may be industrially practiced.

*Example A.*—This example illustrates my improved methods for enameling on sheet iron.

The fritted part is first prepared with the following ingredients, parts by weight:

Raw batch mixture

| | Parts by weight |
|---|---|
| Aluminum hydrate | 16.40 |
| Feldspar | 300.00 |
| Sodium nitrate | 35.00 |
| Borax | 373.50 |
| Fluorspar | 62.20 |
| Soda ash | 24.30 |
| Cryolite | 39.60 |
| Zinc oxide | 138.70 |
| Raw total | 989.70 |
| Melted total | 773.50 |

The batch is mixed and smelted to form an essentially clear melt which is poured into water to obtain the frit which is then dried.

The frit is prepared to slip as follows:—

*Mill mix*

| | Parts by weight |
|---|---|
| Frit | 773.5 |
| —325 mesh $ZrSiO_4$ | 227.5 |
| Zirconium oxide | 60.0 |
| Enameling clay | 60.0 |
| Water as required for good milling about | 350.0 |

This mix is milled in ball mill to point where 100 c. c. sample slip contains about 15 grams residue on 200 mesh sieve.

The enameled article may be prepared by applying the slip over the conventional ground coat in which case the firing can be done at about 1500° F. for three minutes for a 6″ x 4″ panel made of 20 gauge sheet iron. For some purposes the article may be considered finished with one coat applied at rate of about 70 grams enamel per square foot of surface, but in other cases it may be found desirable to apply a coat of another enamel having a higher lustre.

The enamel slip may be used directly on sheet iron as a white ground coat, in which case the iron is prepared by pickling in usual manner, but before drying is given a nickel salt bath treatment which is sometimes called the "nickel flash" treatment, and comprises a bath formed of a solution of nickel ammonia sulphate employed between the customary acid rinse water and the final dilute alkali wash in the conventional pickling procedure used in enameling plants.

The prepared iron is enameled by dipping or spraying of the slip at rate of about 60 grams per square foot on both sides which is equivalent to 30 grams per sq. ft. surface. The piece is then fired at 1520° F. for six minutes.

For some purposes the article may be considered finished but in others it may prove desirable to apply another coat on one side only. For this second coat, if a high lustre is desired, I preferably use an enamel having the composition of "Example A" in said U. S. Kinzie Patent No. 1,944,938. The finish coat may be fired at 1500° F. for two and one-half minutes.

The $ZrSiO_4$ mentioned is preferably a pure product, although for some purposes crude $ZrSiO_4$ that contains small amounts of ilmenite, rutile and other minerals may be used.

In smelting the fritted part a temperature as low as 1700–1800° F. may be used, and so the smelt may be completed in the short time of one-half to one hour, as compared with temperature of 1850–1950° F. for not less than one and one-half hours for a similar sized batch as in "Example A" of Patent No. 1,944,938 which has the same ultimate calculated percentage composition as an enamel.

*Example B.*—This example shows the use of sodium zirconium silicate.

*Batch for frit*

| | Parts by weight |
|---|---|
| Aluminum hydrate | 20.20 |
| Feldspar | 302.10 |
| Sodium nitrate | 35.00 |
| Borax | 205.00 |
| Boric acid | 109.30 |
| Fluorspar | 62.20 |
| Cryolite | 39.60 |
| Zinc oxide | 138.70 |
| Raw total | 912.10 |
| Melted total | 736.80 |

The batch is mixed and smelted at 1700–1800° F. quickly to an essentially clear glass, poured into water, and the frit is preferably dried, although it can of course be used wet or damp if proper allowance is made for its water content.

*Mill mix*

| | Parts by weight |
|---|---|
| Frit | 736.8 |
| Sodium zirconium silicate | 264.3 |
| Zirconium oxide | 60.0 |
| Enameling clay | 60.0 |
| Water about | 350.0 |
| | 1471.1 |

The sodium zirconium silicate is of approximately the following composition:—

| | Percent |
|---|---|
| $ZrO_2$ | 56 |
| $SiO_2$ | 28 |
| $Na_2O$ | 14 |
| Others | 2 |
| | 100 |

This mix is then milled and applied to the ware as in Example A.

The calculated percentage composition of the enamel coatings in Examples A and B is approximately as follows:

| | Percent |
|---|---|
| $K_2O$ | 3.36 |
| $Na_2O$ | 8.88 |
| $CaF_2$ | 5.62 |
| $ZnO$ | 12.53 |
| $Na_3AlF_6$ | 3.58 |
| $B_2O_3$ | 12.35 |
| $Al_2O_3$ | 7.70 |
| $SiO_2$ | 27.86 |
| $ZrO_2$ | 18.13 |
| | 100.01 |

*Example C.*—This example illustrates the enameling of cast iron by the dry process by the use of an opaque white zirconium enamel as the slush or ground coat.

In this example the zirconium was added at the mill mainly as basic lead zirconium silicate.

*Batch for frit*

| | Parts by weight |
|---|---|
| Feldspar | 401.5 |
| Barium carbonate | 172.9 |
| Zinc oxide | 86.9 |
| Aluminum hydrate | 16.7 |
| Sodium nitrate | 35.0 |
| Soda ash | 24.4 |
| Raw total | 807.4 |
| Melted total | 727.4 |

The batch is mixed and then smelted at about 2000–2200° F. to a clear melt, poured into water and the resulting frit is dried.

The slip is prepared in following manner.

*Mill mix*

| | Parts by weight |
|---|---|
| Frit | 727.40 |
| Basic lead zirconium silicate | 272.6 |
| Zirconium oxide | 60.0 |
| Enameling clay | 70.0 |
| Borax | 2.50 |
| Sodium carbonate | 1.25 |
| Water as required for good milling approximately | 300.00 |

This mill mix is milled to a fineness of about five grams residue on 200 mesh sieve from a 100 c. c. sample.

The cast iron was cleaned by sand blasting, and the casting then given a coat of the above slip by spraying at the rate of about 30 grams per sq. ft. surface. The coating was then dried and fired at 1600° F. for period of eight minutes, and, while still hot, —60 mesh enamel powder was dusted on the piece which was returned to the furnace, heated just long enough to smooth out the coating, removed and cooled, with the result that in one dusting over the white ground coat a finished article was produced.

The —60 mesh enamel powder used was prepared according to the formula of "Example E" in the U. S. Kinzie Patent No. 1,944,938.

The finish coating need not, however, be confined to a zirconium enamel as enamels made opaque with antimony or tin compounds may be used for the dusting or cover coat. These finish coatings can be of nonacid-resisting or of the acid-resisting type as may be desired.

The basic lead zirconium silicate used in the "mill mix" was of the following approximate composition:—

|  | Percent |
|---|---|
| PbO | 23 |
| $ZrO_2$ | 52 |
| $SiO_2$ | 25 |
|  | 100 |

My improved methods may be varied in a number of different ways, for example, the zirconium may be supplied partly as the normal lead zirconium silicate of the following approximate composition—

|  | Percent |
|---|---|
| PbO | 54 |
| $ZrO_2$ | 31 |
| $SiO_2$ | 15 |
|  | 100 |

The remainder of zirconium may be supplied as —325 mesh $ZrSiO_4$ and as $ZrO_2$.

Part of the feldspar as well as the small amount of aluminum hydrate may be omitted from the fritted part to make it more fusible, but the feldspar and aluminum hydrate in this case should be milled with the frit and zirconium compounds to produce the enamel slip.

The zirconium may also be supplied within limits of the formulation as barium zirconium silicate ($BaZrSiO_5$), sodium zirconium silicate ($Na_2ZrSiO_5$), zinc zirconium silicate ($ZnZrSiO_5$) or as basic compounds of any one of these compounds or mixtures thereof.

In any case this enamel coating applied directly on the iron would have approximately the following composition calculated in terms of oxide percentages:

|  | Percent |
|---|---|
| $Na_2O$ | } 7.79 |
| $K_2O$ | |
| ZnO | 7.79 |
| BaO | 12.00 |
| PbO | 11.84 |
| $SiO_2$ | 33.92 |
| $Al_2O_3$ | 9.89 |
| $ZrO_2$ | 16.77 |
|  | 100.00 |

The above table is based, of course, on all materials added at the mill, to wit: the frit, zirconium silicates, zirconium oxide and clay, but no account was taken of the borax and magnesium carbonate.

*Example D.*—This example shows my methods of making a glaze for clay ware or other ceramic body, maturing at about 1800° F. to 1980° F. The zirconium is supplied as barium zirconium silicate ($BaZrSiO_5$).

A frit is first made up from the following batch

|  | Parts by weight |
|---|---|
| Borax | 68.30 |
| Quartz powder | 37.50 |
| Zinc oxide | 25.00 |
| Sodium carbonate | 2.33 |
| Raw total | 133.13 |
| Melted total | 100.00 |

The materials are first mixed and then smelted to a glass, poured into water and dried. I usually prefer first to mill this frit dry to about 80 mesh, and then I make a mill charge consisting of the following ingredients:

|  | Parts by weight |
|---|---|
| Frit (about —80 mesh) | 42.16 |
| Barium zirconium silicate | 23.12 |
| Feldspar | 15.83 |
| Fluorspar | 0.88 |
| Clay | 4.36 |
| Calcium carbonate | 6.26 |
| —325 mesh milled zircon | 6.11 |
| Zirconium oxide | 5.00 |
| Water | 40.00 |
|  | 143.72 |

The batch is milled in any suitable mill, preferably a ball mill with stone or porcelain lining, to about —325 mesh. The slip may be deposited by known methods on previously matured ware commonly called "bisque", and then fired or, as I prefer, it is deposited by spraying on the green or unburned clayware or other ceramic shapes while damp, and then heated to a sufficiently high temperature and for a sufficiently long period of time not only to mature the body, but also at the same time to fuse the glaze on the body in a single firing.

The temperature obtained may vary from about 1800° F. to 1980° F., while the time may vary from about ten hours to ten days depending on the type of kiln or furnace used, and whether or not the shape has been previously fired. The expansion properties of the glaze may be varied by known means, such as variation in those constituents known to have the desired effect in lowering or raising the expansion of glazes.

In this glaze of "Example D", as well as in all other examples, there may be used a small amount of tin oxide as well as ceramic colorants to yield any desired color. The zirconium, in conjunction with such elements in the glaze as aluminum, zinc and calcium and barium, serves to render the glaze opaque.

Supplying the zirconium as the double silicate tends to obtain a more ready maturing of the glaze, since the zirconium already combined with an alkaline earth is allowed to fulfill its function the more readily. The fritted part may, of course, be added in the form as obtained as frit from the quenching tank with the milling effected along with the full batch, but since the other materials of the mill batch are relatively fine, it saves time to pre-mill the fritted part.

The fired or finished glaze on the ceramic body will have approximately the following composition calculated to percentage oxide content:

| | Per cent |
|---|---|
| NaKO | 7.36 |
| BaO | 10.54 |
| ZnO | 10.54 |
| CaO | 3.51 |
| $CaF_2$ | .88 |
| $B_2O_3$ | 10.54 |
| $Al_2O_3$ | 4.64 |
| $SiO_2$ | 35.18 |
| $ZrO_2$ | 16.82 |
| | 100.01 |

*Example E.*—This example illustrates a zirconium glaze for firing at 2000° F. to 2250° F. with the zirconium supplied as calcium zirconium silicate product.

A frit is first prepared by mixing and then melting the following batch which is poured into water, etc.

*Frit batch*

| | Parts by weight |
|---|---|
| Borax | 54.64 |
| Quartz powder | 30.00 |
| Zinc oxide | 20.00 |
| Barium carbonate | 25.74 |
| Soda ash | 1.86 |
| Raw total | 132.24 |
| Melted total | 100.00 |

Part of the quenched frit after draining off the excess water is charged to a ball mill along with following materials, parts by weight:

*Mill mix*

| | Parts by weight |
|---|---|
| Frit | 20.00 |
| Calcium zirconium silicate | 34.12 |
| Feldspar | 35.00 |
| Clay | 4.00 |
| Quartz powder | 5.09 |
| Zinc oxide | 3.00 |
| Water | 40.00 |
| | 141.21 |

The charge is milled to a point where practically all solids pass a 325 mesh sieve in sieve analysis, and the slip is discharged from the mill, aged several days to bring to a suitable condition, and then may, after adjustment to suitable spraying consistency, be applied either to bisque or green shapes which are fired to produce a glazed article that may be white or tinted with ceramic coloring stains to produce desired color. As in "Example D", the time of firing will depend upon type of kiln, kind of ware, etc.

The fired glaze will have approximately the following composition in calculated oxide percentages:

| | Per cent |
|---|---|
| $Na_2O$ | 6.62 |
| ZnO | 7.00 |
| CaO | 8.00 |
| BaO | 4.00 |
| $B_2O_3$ | 4.00 |
| $Al_2O_3$ | 7.71 |
| $SiO_2$ | 45.13 |
| $ZrO_2$ | 17.54 |
| | 100.00 |

*Example F.*—This example illustrates a glaze maturing at 2000° F. to 2250° F. by the use of zinc zirconium silicate ($ZnZrSiO_5$) as the source of zirconium.

A frit is first prepared by smelting a mix of the following materials that is poured into water to obtain the frit.

*Frit batch*

| | Parts by weight |
|---|---|
| Borax | 54.64 |
| Barium carbonate | 25.74 |
| Soda ash | 1.86 |
| Calcium carbonate | 35.65 |
| Quartz powder | 30.00 |
| Raw total | 147.89 |
| Melted total | 100.00 |

The frit is dried and is made a part of the following mill charge:

| | Parts by weight |
|---|---|
| Frit | 20.00 |
| Zinc zirconium silicate ($ZnZrSiO_5$) | 42.24 |
| Feldspar | 30.00 |
| Clay | 5.00 |
| Quartz powder | 2.75 |
| Water | 40.00 |
| | 139.99 |

The batch is then milled to a suitable fineness, and is then applied and fired to produce a glaze coating on ceramic articles in substantially the same manner as in Example E.

The temperature at the peak of the firing cycle may be kept at 2000° F. to 2250° F. for from one-half to two hours, and then the charge is cooled slowly enough so as not to set up strains in the article.

The calculated percentage oxide composition of this glaze will be about as follows:

| | Per cent |
|---|---|
| NaKO | 5.96 |
| ZnO | 14.00 |
| CaO | 4.00 |
| BaO | 4.00 |
| $B_2O_3$ | 4.00 |
| $Al_2O_3$ | 7.52 |
| $SiO_2$ | 40.88 |
| $ZrO_2$ | 19.64 |
| | 100.00 |

*Example G.*—This example illustrates a case in which part of the zirconium is supplied as magnesium zirconium silicate.

A frit is first produced by melting a batch mixture which is the same as in the "Example E", then quenching in water, wet milling to about 80 mesh, drying the milled frit, and finally forming a slip by milling as part of the following mill mixture:

| | Parts by weight |
|---|---|
| Frit | 20.00 |
| Magnesium zirconium silicate | 27.72 |
| Feldspar | 40.00 |
| Zirconium oxide | 5.00 |
| Clay | 5.00 |
| Quartz powder | 3.40 |
| Water | 40.00 |
| | 141.12 |

This mix is milled until all passes a 325 mesh screen or finer, and is applied either to a green or bisquit body, and fired to 2000° F. to 2200° F.

to produce an opaque semi-matte to matte glaze.

This mill formula may be varied by the usual methods to adjust the co-efficient of expansion to that of the body on which it is to be applied. The texture may be made brighter by increasing the quartz at the expense of feldspar or vice versa.

The fired glaze will have approximately the following composition in calculated oxide percentages:

| | Percent |
|---|---|
| NaKO | 7.28 |
| ZnO | 4.00 |
| BaO | 4.00 |
| MgO | 5.00 |
| $B_2O_3$ | 4.00 |
| $Al_2O_3$ | 9.38 |
| $SiO_2$ | 46.68 |
| $ZrO_2$ | 19.66 |
| | 100.00 |

*Example H.*—This example illustrates how the zirconium may be supplied mainly as sodium zirconium silicate ($Na_2ZrSiO_5$) such as is set forth in "Example A" of Patent No. 1,944,938.

Except for the zirconium compounds it is an all raw glaze, no fritted part being preliminarily prepared.

*Mill mix*

| | Parts by weight |
|---|---|
| Sodium zirconium silicate | 25.00 |
| Feldspar | 20.00 |
| Clay | 5.00 |
| Calcium carbonate | 14.26 |
| Zinc oxide | 15.00 |
| Zirconium oxide | 6.00 |
| Quartz powder | 21.85 |
| Water | 50.00 |
| | 157.11 |

This mix is milled until all passes a 325 mesh screen or finer, and is applied either to green or biscuit ware and fired to 2000° F. to 2240° F. This mill formula may also be varied in the usual manner to adjust the coefficient of expansion to fit that of the ware on which it is to be applied. The matured glaze on the ware will have the following approximate composition in calculated oxide percentages:

| | Percent |
|---|---|
| NaKO | 8.97 |
| ZnO | 15.00 |
| CaO | 8.00 |
| $Al_2O_3$ | 5.66 |
| $SiO_2$ | 44.54 |
| $ZrO_2$ | 17.83 |
| | 100.00 |

*Example I.*—This example illustrates a clear or but mildly opaque zirconium glaze for use in producing an intense colored glaze, in this example a dense blue colored glaze.

Sodium zirconium silicate of the following composition is used entirely to supply the zirconium:

| | Percent |
|---|---|
| $Na_2O$ | 14.01 |
| $ZrO_2$ | 55.35 |
| $Al_2O_3$ | .77 |
| $SiO_2$ | 29.00 |
| | 99.13 |

The following ingredients are first milled in suitable mill until all will pass through a 325 mesh screen. The milled mixture is applied to the ware and then burned on the ware as before described as in Example G or H. This glaze matures to a good deep blue at 2060° F. and will burn to a good glaze at any usual glazing temperature above the temperature just stated.

*Milled mixture*

| | Parts by weight |
|---|---|
| Sodium zirconium silicate | 15.00 |
| Feldspar | 41.20 |
| Quartz | 25.23 |
| Aluminum hydrate | 7.34 |
| Calcium carbonate | 8.93 |
| Barium carbonate | 6.43 |
| Zinc oxide | 5.00 |
| Clay | 6.00 |
| Blue ceramic colorant | 2.00 |
| Water | 55.00 |
| | 172.13 |

This glaze will have a calculated oxide percentage composition as follows:

| | Percent |
|---|---|
| NaKO | 6.59 |
| CaO | 4.61 |
| BaO | 4.61 |
| ZnO | 4.61 |
| $Al_2O_3$ | 13.05 |
| $SiO_2$ | 57.03 |
| $ZrO_2$ | 7.65 |
| Colorant | 1.84 |
| | 99.99 |

*Example J.*—This example illustrates how the enamel of "Example A" may be made with a zinc zirconium silicate.

*Raw batch to be smelted into the fritted portion*

| | Parts by weight |
|---|---|
| Aluminum hydrate | 16.40 |
| Feldspar | 30.00 |
| Sodium nitrate | 3.50 |
| Borax | 37.35 |
| Fluorspar | 6.22 |
| Soda ash | 2.43 |
| Cryolite | 3.96 |
| Zinc oxide | 1.87 |
| | 86.97 |
| Melted weight | 65.35 |

The frit is prepared in the same manner as outlined for "Example A". The mill mix comprises the following ingredients:

| | Parts by weight |
|---|---|
| Frit | 65.35 |
| Zinc zirconium silicate | 38.99 |
| Enameling clay | 6.00 |
| Water | 35.00 |
| | 145.34 |

The approximate composition of this zinc zirconium silicate used was

| | Percent |
|---|---|
| ZnO | 30.78 |
| $ZrO_2$ | 46.50 |
| $SiO_2$ | 22.72 |
| | 99.00 |

The calculated percentage of this fired enamel is the same as in "Example A". The firing properties, however, will be somewhat different due to the previous reaction of the refractory zirconium silicate with the zinc flux.

*Example K.*—Calculating the batch of "Example B" to the sodium zirconium silicate of the following theoretical composition

|  | Per cent |
|---|---|
| $Na_2O$ | 25.30 |
| $ZrO_2$ | 50.18 |
| $SiO_2$ | 24.52 |
|  | 100.00 |

Batch for the fritted portion is as follows:

|  | Parts by weight |
|---|---|
| Aluminum hydrate | 2.02 |
| Feldspar | 30.21 |
| Sodium nitrate | 3.50 |
| Boric acid | 24.24 |
| Fluorspar | 6.22 |
| Cryolite | 3.96 |
| Zinc oxide | 13.87 |
|  | 84.02 |
| Melted | 66.18 |

Mill additions for making finished enamel slip are as follows:—

|  | Parts by weight |
|---|---|
| Frit | 66.18 |
| Sodium zirconium silicate | 29.50 |
| Zirconium oxide | 6.00 |
| Enameling clay | 6.00 |
| Water | 35.00 |
|  | 142.68 |

The melted composition of this enamel is the same as the enamels in Examples A, B, and J.

*Example L.*—This example illustrates the making of an enamel for sheet iron having little or no opacity for use in producing an intensely colored enamel, possessing the strength of zirconium enamels. Potassium zirconium silicate was used as the source of the zirconium.

*Raw batch for frit*

|  | Parts by weight |
|---|---|
| Feldspar | 32.57 |
| Quartz | 20.91 |
| Soda nitre | 3.50 |
| Borax | 19.01 |
| Boric acid | 5.23 |
| Cryolite | 5.41 |
| Fluorspar | 4.51 |
| Zinc oxide | 1.80 |
| Whiting | 1.60 |
|  | 94.56 |
| Melted weight | 80.30 |

This raw batch was formed into the frit according to the steps described in preceding examples.

*Mill mix for green enamel*

|  | Parts by weight |
|---|---|
| Frit | 80.30 |
| Potassium zirconium silicate | 18.85 |
| Enameler's clay | 6.00 |
| Green ceramic colorant | 3.00 |
| Water | 35.00 |

The slip is prepared and applied in usual manner and fired at about 1540° F. for about three minutes to produce a green enamel. Other ceramic colorants can of course be used to produce colors other than green.

The potassium zirconium silicate referred to in this mill mix has a theoretical composition approximately as follows:

|  | Per cent |
|---|---|
| $K_2O$ | 33.97 |
| $ZrO_2$ | 44.36 |
| $SiO_2$ | 21.67 |
|  | 100.00 |

The calculated oxide percentage composition of the melted enamel was as follows:

|  | Per cent |
|---|---|
| NaKO | 15.05 |
| $CaF_2$ | 4.38 |
| CaO | 0.87 |
| $Na_3AlF_6$ | 5.25 |
| ZnO | 1.75 |
| $B_2O_3$ | 9.62 |
| $SiO_2$ | 44.82 |
| $Al_2O_3$ | 7.22 |
| $ZrO_2$ | 8.12 |
| Green ceramic colorant | 2.91 |
|  | 99.99 |

I claim as my invention:

1. The method of making opaque vitreous enameled and glazed ware, which comprises smelting part of a raw batch mixture of fusible enamel ingredients to form a relatively fluid melt and clear frit, then milling said clear frit mixed with lead zirconium silicate, the remaining ingredients of the batch and water to prepare the enamel slip, coating said ware with said slip and burning same to form said opaque enameled and glazed ware.

2. The method of making opaque vitreous enameled and glazed ware, which comprises smelting part of a raw batch mixture of readily fusible enamel ingredients to form a relatively fluid melt and clear frit, then milling said clear frit mixed with zinc zirconium silicate, the remaining ingredients of the batch and water to prepare the enamel slip, coating said ware with said slip and burning same to form said opaque enameled and glazed ware.

3. In the preparation of a slip for use in opaque vitreous enameling and glazing, the steps which consist in smelting a part of a raw batch of readily-fusible enamel ingredients to form a clear frit, and then mixing said frit with lead zirconium silicate and the remaining ingredients of the batch at the mill.

4. In the preparation of a slip for use in opaque vitreous enameling and glazing, the steps which consist in smelting a part of the raw batch of readily-fusible enamel ingredients to form a clear frit, and then mixing said frit with a zinc zirconium silicate and the remaining ingredients of the batch at the mill.

CHARLES J. KINZIE.